W. ENGBERG.
TOOL.
APPLICATION FILED JULY 16, 1921.
1,430,497.
Patented Sept. 26, 1922.
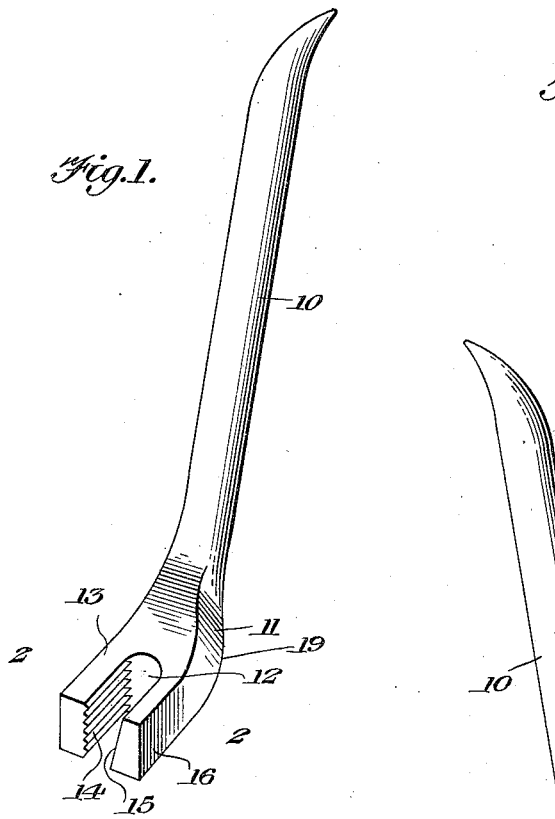
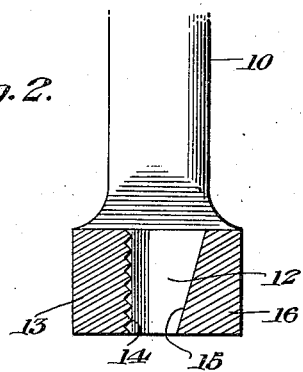
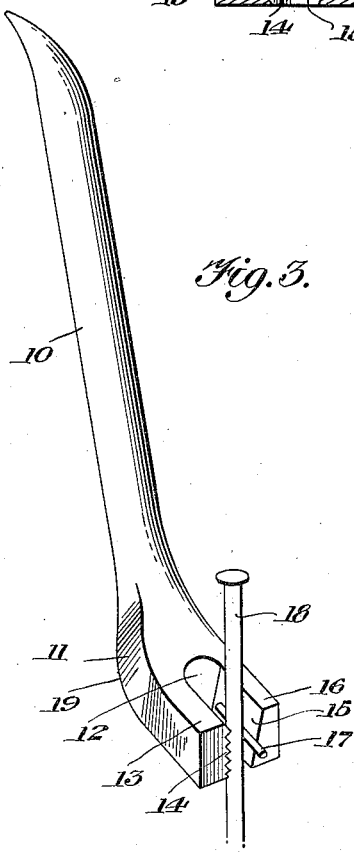
Waldemar Engberg
INVENTOR
BY Victor J. Evans
ATTORNEY
WITNESS:

Patented Sept. 26, 1922.

1,430,497

UNITED STATES PATENT OFFICE.

WALDEMAR ENGBERG, OF ANCHORAGE, TERRITORY OF ALASKA.

TOOL.

Application filed July 16, 1921. Serial No. 485,217.

*To all whom it may concern:*

Be it known that I, WALDEMAR ENGBERG, a citizen of the United States, residing at Anchorage, Alaska, have invented new and useful Improvements in Tools, of which the following is a specification.

This invention comprehends the provision of a nail extractor or the like, and embodies means whereby an effective grip may be obtained upon the shank of the nail or the like to be extracted, irrespective of the diameter of the shank.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein:

Figure 1 is a perspective view of the device forming the subject matter of my invention.

Figure 2 is a fragmentary detailed view, showing the offset bifurcated extremity in section.

Figure 3 is a view showing the manner of associating the device with the shank of a nail or the like to be extracted.

The device forming the subject matter of my invention comprises a handle 10 one end of which is offset as at 11 and bifurcated as at 12. The inner wall of one of the separated portions 13 defined by said bifurcation is provided with teeth 14 while the confronting wall 15' of the other separated portion 16 defined by said bifurcation is beveled or inclined for a purpose to be presently described. A pin 17 is used in connection with the tool in obtaining an effective grip upon the shank 18 of the nail or the like to be extracted.

In practice, the bifurcated extremity of the handle 10 is arranged to straddle the shank 18 of the nail or the like, after which the pin 17 is positioned within the shank 18 of the inclined wall 15. Consequently, after the handle is depressed with the curved portion 19 providing a fulcrum for the tool, the pin 17 slipping upon the inclined portion 15 as a wedge, causes the shank 18 to be effectively gripped between the pin 17 and the teeth 14. By reason of the construction, it is manifest that the device can be used in this manner with nails or the like wherein the shanks 18 vary in diameter, with no possibility of the tool slipping while it is being used to extract the nail.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:

1. A tool of the character described comprising a handle, one extremity of the handle being offset and bifurcated, teeth formed on the wall of one of the separated portions defined by said bifurcation, and the confronting wall of the other separated portion defined by said bifurcation being inclined for the purpose specified.

2. A device of the class described comprising a handle having an offset extremity, said extremity being bifurcated defining separated portions, the inner wall of one of said portions being inclined or beveled, teeth formed on the confronting wall of the other separated portion, and a pin adapted to repose upon the inclined portion for the purpose specified.

3. A nail extractor having bifurcated and defining separated portions adapted to straddle the shank of the nail to be extracted, teeth formed on the inner wall of one separated portion, the confronting wall of the other separated portion being inclined or beveled, and a pin adapted to be loosely positioned between the inclined portion and the shank of the nail as and for the purpose specified.

In testimony whereof I affix my signature.

WALDEMAR ENGBERG.